United States Patent [19]

Putt et al.

[11] Patent Number: 4,747,575
[45] Date of Patent: May 31, 1988

[54] DE-ICER

[75] Inventors: James C. Putt, Doylestown; Kevin L. Lefeel, Akron, both of Ohio

[73] Assignee: The B. F. Goodrich Company, Akron, Ohio

[21] Appl. No.: 74,196

[22] Filed: Jul. 16, 1987

[51] Int. Cl.[4] ........................ F16K 31/40; B64D 15/16
[52] U.S. Cl. .............................. 251/30.02; 137/624.14; 244/134 R
[58] Field of Search ................ 251/30.02; 137/624.14; 244/134 R

[56] References Cited

U.S. PATENT DOCUMENTS

| | | | |
|---|---|---|---|
| 2,168,328 | 8/1939 | Diehl | 244/134 |
| 2,440,533 | 4/1948 | Antonson | 244/134 |
| 2,504,684 | 4/1950 | Harper | 244/134 A |
| 2,957,662 | 10/1960 | Hess | 244/134 |
| 3,370,814 | 2/1968 | Kageorge et al. | 244/134 |
| 3,549,964 | 12/1970 | Levin et al. | 317/262 |
| 3,604,666 | 9/1971 | Achberger | 244/134 A |
| 3,682,436 | 8/1972 | Leqille | 251/30.02 |
| 3,690,601 | 9/1972 | Roemke | 244/134 A |
| 3,891,164 | 6/1975 | Hertrick et al. | 244/134 A |
| 4,561,537 | 12/1985 | Dos Santos | 198/628 |

FOREIGN PATENT DOCUMENTS

| | | | |
|---|---|---|---|
| 505433 | 5/1939 | United Kingdom | 244/134 A |
| 523880 | 7/1940 | United Kingdom | 244/134 |

Primary Examiner—Arnold Rosenthal
Attorney, Agent, or Firm—Woodrow W. Ban

[57] ABSTRACT

A chattering valve for use in a pulse pneumatic de-icer.

2 Claims, 6 Drawing Sheets

DE-ICER

FIELD OF THE INVENTION

This invention relates to apparatus for de-icing leading edges. More particularly, this invention pertains to the de-icing of aircraft leading edge surfaces such as are associated with wings, struts, stabilizers, and propellers. Specifically, this invention relates to pneumatically actuated de-icers for use on leading edges.

BACKGROUND OF THE INVENTION

Since the early days of powered avaition, aircraft have been, from time to time, troubled by accumulations of ice on component surfaces of the aircraft such as wings and struts, under certain flight conditions. Unchecked, such accumulations can eventually so laden the aircraft with additional weight and so alter the aerofoil configuration of the wings as to precipitate an unflyable condition. A search for means to combat the accumulation of ice under flying conditions has been a continuing one and has resulted in three generally universal approaches to removing accumulated ice, a process known generally as de-icing.

In one form of de-icing, leading edges, that is edges of the aircraft component on which ice accretes and are impinged upon by the air flowing over the aircraft and having a point at which this airflow stagnates, are heated to loosen adhesive forces between accumulating ice and the aircraft component. Once loosened, this ice is generally blown from the aircraft component by the airstream passing over the aircraft. Two methods of heating leading edges have enjoyed significant popularity. In one approach a heating element is placed in the leading edge zone of the aircraft component either by inclusion in a rubber boot applied over the leading edge or by incorporation into the skin structure of the aircraft component. This heating element, typically powered by electrical energy derived from a generating source driven by one or more of the aircraft engines, is switched on and off to provide heat sufficient to loosen accumulating ice. In small aircraft powered typically by one or two engines, a sufficient quantity of electrical power may be unavailable for use in electrical de-icing.

In the other heating approach, gasses at elevated temperature from one or more compression stages of a turbine engine are circulated through leading edges of components such as wings and struts in order to effect a thermal de-icing or anti-icing effect. Employed typically only in aircraft powered by turbine engines, the use of these so-called compressor bleeds or by-pass streams from the aircraft engine turbine can result in reduced fuel economy and a lower turbine power output.

The second commonly employed method for de-icing employs chemicals. In limited situations a chemical has been applied to all or part of the aircraft to depress adhesion forces associated with ice accumulations forming upon an aircraft or to depress the freezing point of water collecting upon surfaces of the aircraft.

The remaining commonly employed method for de-icing is typically termed mechanical de-icing. In the principal commercial mechanical de-icing means, pneumatic de-icing, the leading edge zone of a wing or strut component of an aircraft is covered with a plurality of expandable, generally tube-like structures inflatable employing a pressurized fluid, typically air. Upon inflation, the tubular structures tend to expand substantially the leading edge profile of the wing or strut and crack ice accumulating thereon for dispersal into the airstream passing over the aircraft component. Typically, such tube like structures have been configured to extend substantially parallel to the leading edge of the aircraft component. For aerofoils such as wings and stabilizers, these structures may extend the entire span of the aerofoil. A plurality of tube-like structures frequently are positioned on a wing or strut and typically are configured to be parallel to the leading edge of the wing or strut as by placement of a spanwise succession of tubes spaced in chordwise manner away from the leading edge. The plurality of tubes can provide an ice removal function to the entire leading edge profile of the aerofoil or strut.

Conventionally, pneumatic de-icers are formed from a compound having rubbery or substantially elastic properties. Typically, the material forming tubes on such de-icer structures can expand or stretch by 40% or more during inflation cycles causing a substantial change in the profile of the de-icer (as well as thereby the leading edge) and thereby cracking ice accumulating on the leading edge. At least in part because of the large volume of air required for inflating such highly expandable tubes, the times for inflating such tubes have typically historically averaged between about 2 and about 6 seconds. The distortion engendered in an aerofoil profile by inflation of the tubes can substantially alter the airflow pattern over the aerofoil and can adversely effect lift characteristics of the aerofoil.

The rubber or rubber like materials forming these conventional pneumatic de-icers typically are possessed of a modulus of elasticity of approximately 6900 kPa. Ice, as is well known, is possessed of an elastic modulus enabling typical ice accumulations to adjust to minor changes in contours of surfaces supporting such ice accumulations. The modulus of elasticity for ice is variously reported as being between about 275,000 kPa and about 3,450,000 kPa. The modulus of elasticity of rubber compounds used in conventional de-icers however is substantially different from the modulus of elasticity typically associated with ice accumulations, and the large, 40% or greater expansion undergone by the de-icer during inflation traditionally has functioned to crack or rupture the structure of the ice accumulations thereon allowing such accumulations to be swept away by impinging wind streams.

Ice accumulations, in conforming to minor alterations in the contours of surfaces supporting the ice accumulations do so only somewhat slowly. The phenomenon by which ice accumulations conform to changing contours of support surfaces in some ways may resemble the phenomenon of cold flow in thermoplastic materials. Where the ice accumulations are exposed to extremely rapid but minor deformations, an ice coating cannot accommodate such contour changes sufficiently rapidly and shatters as though struck with a hammer. More recently, it has been discovered that a subjecting leading edges of a wing or a stabilizer to electromechanical induced hammering, such as is shown by U.S. Pat. No. 3,549,964, can assist in removing accumulations of ice on the leading edge. Concern respecting the susceptibility of such leading edges to stress fatigue upon being hammered over extended periods of time as yet have functioned in part to preclude substantial commercial development of such electromechanical hammering schemes.

A means for de-icing a leading edge not requiring the application of electrothermal de-icers and/or not requiring the application of pneumatic de-icers which, during the inflated state, substantially distort the leading edge profile for an extended period of time thereby interfering with the efficient performance of a device associated with the leading edge could find substantial application in industry. Additionally, where such a means for de-icing a leading edge does not pose a significant likelihood for long term structural damage associated with stress or fatigue such as may be associated with electromechanical hammering, such a de-icing means could find substantial commercial utility.

SUMMARY OF THE INVENTION

The present invention provides an apparatus for de-icing ice accreting surfaces and finds particular utility in the de-icing of aerofoils leading edges, struts and the like associated with aircraft. The de-icer of the present invention includes a sheet-like skin possessed of a substantially elevated modulus and formed into a desired configuration having an ice accreting surface associated therewith. The de-icer further includes a support surface separate and apart from the skin and positioned obversely with respect to the ice accreting surface.

At least one principal inflation tube is positioned between the support surface and the skin. A means is provided for introducing a fluid under pressure into the principal inflation tube in a quantity sufficient to inflate the principal inflation tube to a desired extent at which desired deformation of the skin occurs to a degree sufficient to detach and then dislodge or expel ice accumulations upon the ice accreting surface into a stream of fluid flowing over the ice accreting surface. Yet inflation is not accomplished to an extent sufficient to exceed a stress level characterizing an endurance limit for the material forming the skin. A means is provided for subsequently deflating the principal inflation tube.

The de-icer of the invention may include a plurality of additional inflation tubes positioned between the support surface and the skin and configured, likewise, for inflation to an extent sufficient to deform the skin to a degree sufficient to dislodge ice accumulations upon the ice accreting surface thereover without exceeding stress endurance limit for the material from which the skin is formed.

In the practice of the invention, the principal inflation tube or tubes typically are formed from at least one ply of a fabric coated on at least one surface with a rubberizing or plasticizing compound, and formed and vulcanizably cured or thermoplastically molded as is appropriate to define the principal inflation tube. Typically, any principal inflation tube is affixed to the support surface.

In the practice of the invention, it may be desirable to include a ply positioned intermediate the skin and the support surface to lie between the principal inflation tube and the skin. The additional inflation tubes may be attached to this intermediate ply and configured to lie either between the intermediate ply and the skin or between the intermediate ply and the support surface.

In the practice of the invention, it may be desirable to interconnect the principal inflation tube or tubes with the additional inflation tubes whereby a fluid under pressure employed to inflate the principal inflation tube can thereafter pass into and be employed to inflate the additional inflation tubes. In the practice of the invention, it may be desirable to inflate the principal inflation tube(s) are joined to the within not more than 0.25 seconds. Where the principal inflation tube(s) are joined to the additional inflation tubes for inflation of the additional inflation tubes employing the fluid under pressure used to inflate the principal inflation tube(s), following inflation of the principal inflation tube within the 0.25 seconds, the additional inflation tubes typically become inflated more slowly and can function thereby to partially de-pressurize the principal inflation tube(s) if desired.

In certain preferred embodiments a pulse of fluid partially inflates the principal tube(s) causing the high modulus skin to dislocate and then stop suddenly. Momentum imparted to the ice accumulations thereby causes additional ice movement which assists in ice detachment and dislodgment. Additional further inflation in staged pulses can further enhance effective ice removal. Use of a valve for inflation characterized by a chattering mode of operation can be effective in achieving such a "start-stop" inflation pattern.

Typically, the skin is an outer skin defining a leading edge of an aerofoil such as an aircraft wing, aileron, propeller, rotating wing such as a helicopter rotor or tail or tail rotor. The skin preferably is formed of titanium, aluminum, steel, including stainless steels, high modulus polymers, and elevated modules polymeric composites, all elevated modulus materials.

In the method, at least one principal inflatable tubular structure is periodically inflated and deflated in a cavity between the skin and the support surface for the principal inflatable tubular structure. Inflation is accomplished employing a fluid under pressure. The sufficient extent to detach and dislodge accreted ice but insufficiently pressurized whereby stresses placed upon the skin do not exceed an endurance limit for the material from which the skin is formed.

In preferred embodiments the invention a pair of principal tubular structures are inflated between the support surface and the skin, the principal tubular structures being spaced apart one from the next to an extent sufficient to assure that upon inflation, bending distortion of the skin by reason of such inflation does not exceed a microstrain characterizing a substantial likelihood of fatigue failure for the skin within a million inflation/deflation cycles of the tubes. Preferably, an additional plurality of tubes between the support surface and the skin are inflated in coordinated manner with the principal inflation tube to produce a distortion of the skin thereover sufficient to detach and dislodge accumulations of ice thereon. In certain preferred embodiments of the invention, the inflatable tubular structures are inflated within not more than about 0.10 seconds and preferably not more than about 0.50 milliseconds. Pulsating inflation is contemplated as within the purview of the invention.

The above and other features and advantages of the invention will become more apparent when considered in light of a description of a preferred embodiment of the invention together with drawings which follows forming a part of the specification.

BEST EMBODIMENT OF THE INVENTION

The present invention provides an apparatus for de-icing a leading edge surface. By "de-icing" what is meant is the removal of ice subsequent to formation of the ice upon the leading edge. By "leading edge" what is meant is that portion of a surface of a structure which functions to meet and in substantial measure break, an airstream impinging upon the structure. Examples of leading edges would be forward edge portions of wings, stabilizers, struts, nacelles, propellers, rotating wings such as helicopter rotors, tail rotors and other housings, objects and protrusions first impacted by an airstream flowing over an aircraft in flight as well as spars, struts and other structural elements of marine vessels, towers and buildings.

Figure 1:
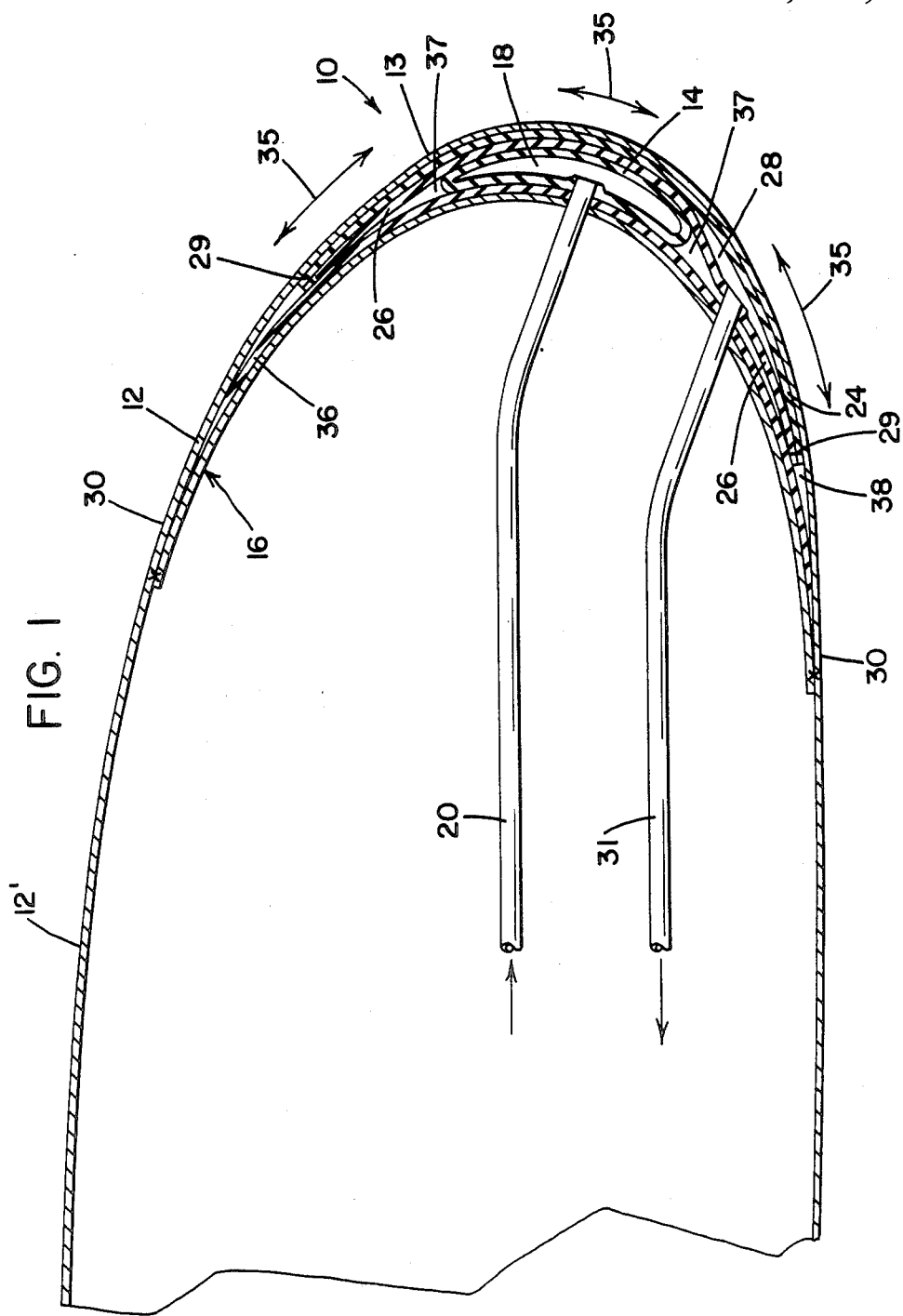
FIG. 1 is a side elevational view of an aircraft wing incorporating a de-icer in accordance with the invention.

Referring to the drawings, FIG. 1 depicts one embodiment of an aircraft wing leading edge de-icer 10 in accordance with the invention.

The de-icer 10 includes an outer layer or skin 12 formed of a substantially rigid material such as a plastic or metal having a substantially elevated modulus of elasticity or so-called Young's modulus. This modulus of elasticity should be at least 40,000 kPa. Preferably this modulus of elasticity approaches or exceeds the modulus of elasticity associated with ice accumulating upon the leading edge, so that preferably this modulus of elasticity is at least 275,000 kPa. In most modulus of elasticity may extend to encompass about 7,500,000 kPa or greater.

A principal inflatable member 14 and a support surface 16 are provided with the principal inflatable member 14 typically being affixed by adhesion or other suitable or conventional means to the support surface 16. It should be apparent that the outer skin 12 can be formed as part and parcel of an aircraft skin 12' defining the outer contour of the wing, can be attached to the aircraft skin 12', or can be separately attached to the aircraft with the support surface 16 instead being part and parcel of the aircraft skin 12'. In the embodiment of FIG. 1, the de-icer skin 12 is shown as part and parcel, that is a continuation of, the aircraft skin 12'.

The principal inflatable member 14 is a tube-like structure typically running the length of the de-icer 10 and formed of a fabric material coated on at least one surface with a rubberizing compound or plasticizing. The tube 14 is formed so that the surface coated with the rubberizing or plasticizing compound faces outwardly from the center of the inflatable member 14 and therefore defines inflation chamber or cavity 18 within the tubular member 14. Suitable materials and techniques for the forming of tubular members from rubberized or plasticized fabric are known in the art of rubberized and plasticized fabric working. An inflation conduit 20 is provided fluid communication with the inflation chamber 18 in suitable or conventional manner.

Figure 3:
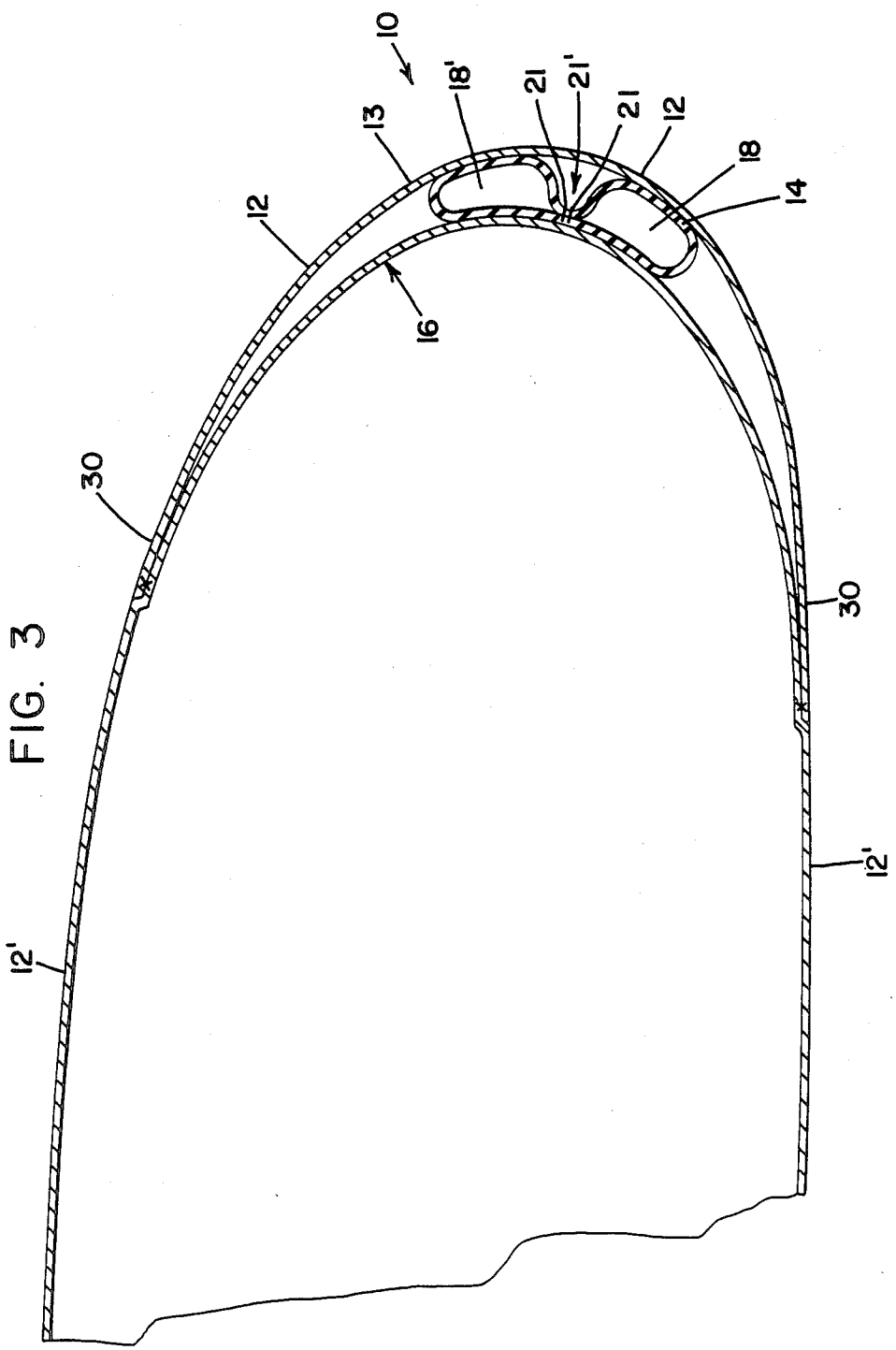
FIG. 3 is a depiction of an alternate de-icer tube configuration for use in the wing of FIG. 1.

Only a single principal inflation member 14 is depicted in FIG. 1. It should be understood that a plurality of principal inflation members or a plurality of chambers within a single principal inflation member 14 may be positioned between the outer skin 12 and the support surface 16 and configured for inducing distortion of the outer skin upon inflation. As shown in FIG. 3 for example, the inflation tube 14 can be stitched to provide a pair of parallel inflation chambers 18, 18' with fluid communication therebetween via the stitching. Where the stitching is sealed or adhesive or chemical bond substituted for the stitching a pair of parallel inflation tubes result.

Referring again to FIG. 1, an upper intermediary ply 24 and a lower intermediary ply 26 are positioned beneath the skin 12. These plies 24, 26 are suitably formed of a fabric material coated on one surface with a rubberizing or plasticizing coating compound in well-known manner. In the upper intermediate ply 24, the rubberizing or plasticizing coating faces in a direction outwardly towards the skin 12 and the ply 24 is bonded to the skin 12. In the lower intermediate ply 26, the rubberizing or plasticizing coating compound faces in a direction inwardly away from the skin whereby the uncoated fabric or sides or surfaces of the intermediate plies 24, 26 cooperate to define an interstitial space 28 between the plies 24, 26.

The fabric employed in the intermediate plies 24, 26 may be of any suitable or conventional nature. Preferably a rayon, polyester, aramid, nylon or acrylic fiber-based fabric is employed. The rubberizing or plasticizing compound can be of any suitable or conventional nature such as natural, synthetic, styrene-butadiene or chloroprene rubbers and plasticizing thermoplastic or plasticizing thermosetting resins as these terms are known in the art and useful mixtures thereof, all as suitable for bonding to the outer skin 12 or to other structural components of the de-icer 10. Appropriate rubberizing compounds and plasticizing compounds are well-known in the rubber and/or plastic compounding field.

The plies 24, 26 may be joined by mechanical or chemical attachment such as by heat sealing, chemical bonding, adhesives, or, as shown by the drawing in FIG. 1, by stitching 29 adjacent at least one trailing edge 30 of the de-icer.

Optionally, a bonding ply 36 is provided and the principal inflation member 14 is affixed to the bonding ply 36. Affixation can be accomplished by adhesion, vulcanized bonding, or other suitable or conventional method. The bonding ply 36 typically is formed from rubber or a rubber-like material such as a plasticizing compound that may include a fabric reinforcement, the rubber or rubber-like material being selected as suitable for bonding to the support surface 16. Suitable or conventional rubber or rubber-like plasticizing materials are well-known in the art and the selection of a particular compound or fabric material typically is predicated upon a number of factors which may include the nature of the support layer 16 to which the bonding ply 36 is affixed, and the relative cost and availability of various fabrics and of natural and synthetic rubbers or plasticizing rubber-like agents. Chloroprenes such as NEOPRENE ® (duPont) and nitrile rubbers are preferred as bonding ply 36 rubber materials.

The principal inflatable member 14 is of a size and shape such that when inflated to a desired pressure, typically between about 69 and 276 kPa, the outer skin 12 is deformed above the tubular member to an extent of not more than about 0.5 centimeters and preferably not more than approximately 0.25 centimeters. The actual distortion required is in part a function of the physical configuration for leading de-icer 10 and the nature of ice deposits formed thereon. Typically such distortions are desirable in a range of between 0.1 and 0.35 centimeters. By deformed or distorted what is meant is movement of a point on the de-icer 10 outer skin 12 from a physical location while the principal inflation tube is placid to a physical location once the principal inflation tube has been inflated to the desired extent and pressure.

Distortion of the outer skin pursuant to inflation of the principal tubular member 14 produces chordwise strain depicted in FIG. 1 by lines 35 in the outer skin 12. This distortion and the accompanying chordwise strain eventually reaches a point where stresses develop at the interface between ice and the outer skin 12 which stresses serve to break the adhesive bond of the ice to the skin thereby detaching the ice, and develop cohesive fractures in the ice itself due, it is believed, to an inability of the ice to accommodate rapidly strain to the extent of the rapidly induced strain in the skin 12 to which the ice is attached. At the same time the inflation action produces a distortion motion in the skin 12 and ice and momentum thereby is applied to the ice. As the skin stops moving when inflation is completed, the ice momentum functions to dislodge and eject the detached ice from the skin 12.

Where inflation is accomplished slowly, insufficient momentum may not be imparted to the ice to secure dislodgment or ejectment of the detached ice absent the existence of additional forces. Such forces can include centrifugal force associated with motion of propellers or rotating wings and tail rotors or distortional turbulence in an airstream impinging the leading edge.

The use of step-off filets 37, 38 may be desirable in assuring a uniformly smooth profile for the de-icer 10 as depicted in FIG. 1.

The chordwise strain depicted by the lines 35 in FIG. 1 imparts a certain, very limited stretching motion in the outer de-icer skin 12. Stretching in the outer skin 12 is limited because, unlike conventional pneumatic de-icers, the outer skin is possessed of a high modulus elasticity. High modulus considerations are not important with respect to the rubberized intermediate plies 24, 26, if used, and the bonding ply 36, if present, which are intended to be substantially low modulus. Modulus considerations are very important however for the outer skin 12 and typically are important for the support layer 16 which are both intended to be formed of material having a substantially high modulus. Accordingly, the outer skin is formed of a substantially high modulus material having an ultimate elongation necessarily greater than that of the ice accumulations preferably greater than about $\frac{1}{4}\%$ and most preferably greater than about $\frac{1}{2}\%$. By ultimate elongation what is meant is the percentage of permanent deformation remaining after tensile rupture. The operational elongation to which the outer skin 12 is subjected, that is elongation strain associated with routine, ordinary operation of the de-icer, as a result of chordwise strain represented by the lines 35 in FIG. 1 should be comfortably less than the ultimate elongation inherent to the material forming the outer skin 12 defining the outer surface of the de-icer. Where the operational elongation exceeds the ultimate elongation, premature and potentially catastrophic failure of the outer skin 12 may occur. Equally important, the operational elongation should not induce or effect a strain as depicted by the lines 35 in excess of a strain associated with early fatigue failure of the material forming the skin, again to avoid premature and possibly catastrophic failure.

Likewise, the support ply 16 or layer must be formed of substantially high modulus materials to assure against detrimental or deleterious deformation of the support ply during inflation of the principal inflation tube 14 and leading therefore to a failure to adequately strain the outer skin 12.

The outer skin 12 may be formed from suitable or conventional materials such as metals or plastics. Thin sheets of stainless steel, annealed stainless steel, thin sheets of titanium or annealed titanium and to a lesser extent aluminum are of great utility in the practice of the invention as having a very desirable Young's modulus. Plastics having the characteristic of a high modulus of elasticity or Young's modulus and a suitable ultimate elongation find utility in forming an outer skin.

By "thin" what is meant is 0.00254 to about 0.0254 centimeters for metals and 0.008 centimeters to 0.0508 for non metals. One plastic material finding particular use in the practice of the invention is polyetheretherketone (Peek) available from ICI. Other suitable or conventional plastic material such as polycarbonates, acetals, nylons, polyesters, polyvinyl fluorides, polyethylenes, epoxy resins formed into composites as well as pherrolic resins formed into composites and the like can be employed in the practice of the instant invention. Such materials will possess an ultimate elongation greater than about 3.0% and preferably greater than about 5.0% and an elastic modulus or Youngs modulus of at least about 40,000 kPa and preferably at least about 275,000 kPa but up to about 7,500,000 kPa or more. The use of certain polymeric materials in lieu of metals in forming the skin 12 may be advantageous due to a lower tendency for ice to adhere to such polymeric materials. The outer skin 12 of the de-icer 10 can define a structural leading edge, thus performing a dual role.

While it had previously been a generally accepted postulation that high modulus materials must be their nature require de-icing employing an extremely rapid deformation, it is a feature and advantage of the present invention that deformation can be accomplished at a more measured pace. Accordingly, and surprisingly, inflation rates or times characterizing priorly known highly elastic pneumatic de-icers mounted upon ice accreting surfaces of wings can also be employed with respect to the principal inflation tube 14 associated with the instant invention. As though the principal inflation tube 14 may inflate over a period of time as long as between about one and about five seconds. Nonetheless and notwithstanding relatively slow but full inflation of the principal inflation tube 14, the strain placed thereby upon the skin 12 is sufficient to detach and assist in dislodging ice accumulations thereon notwithstanding the substantially elevated modulus of elasticity associated with the skin 12. The presence of additional forces such as rotational motion of the leading edge or turbulent disturbances in the airstream flowing over the leading edge may be required to assure a complete dislodging of all ice so detached. These results would appear to be contrary to all the prior teachings in the art with respect to de-icing as a function of gradual deformation of an ice accreting surface.

In the practice of the invention, it is of course equally possible that the principal inflation tube be inflated in such a manner that deformation of the outer skin 12 to a degree sufficient to discharge ice accumulations thereon can be accomplished in less than the about one to five seconds associated with ordinary pneumatic de-icers, more particularly in less than 0.10 seconds, preferably less than 50 milliseconds, and most preferably less than 20 milliseconds. Pulsating inflation has been particularly effective where shorter inflation times are employed. Particularly where centrifugal or turbulent airflow forces, for example, are available, it is not essential that inflation of the principal inflation tube 14 to the desired extent to effect detachment and discharge of ice upon the skin 12 be accomplished in less than the time ordinarily associated with the inflation and deflation cycle of a conventional pneumatic de-icer. While both rapid and more leisurely inflation cycles can function to remove ice accumulations of a thickness of 0.6 centimeters or less, it has been found that ice accumulations of less 0.05 can, surprisingly, be effectively removed by a relatively slower inflation/deflation cycle for the principal inflation tube 14 much akin to the more rapid inflation mode where the inflation tube is inflated to a desired extent in a relatively short period of time such as less than 0.10 seconds, preferably less than 50 milliseconds or most preferably less than 20 milliseconds. While such very short inflation/deflation cycles can function to, in the vernacular, blast rather thick ice accumulations from the outer skin 12, it has been found that a slower inflation/deflation cycle may be under many circumstances, as effective in removing very thin ice layers. Such removal is particularly advantageous where additional forces are present such as in conjunction with propeller or rotating wing de-icing.

Where the principal tubular member 14 as shown in FIG. 1 is inflated employing a fluid under pressure at rates more characteristic of conventional de-icers, that is 0.50-5 seconds, the pressurizing fluid can be introduced in a suitable or conventional manner. Typically, pressurized fluid is introduced along a conduit 20 in well-known manner to the principal inflation tube 14. Where a source of fluid, such as air, under pressure is employed via the conduit 20 to inflate the tubular inflation chamber 18, the source of fluid under pressure can be regulated to provide a fluid pressure not greater than that necessary to achieve a desired degree of inflation to effectively remove accumulations of ice from a surface 13 of the de-icer 10. For rapid inflation modes, preferably a source of fluid under pressure greater than the pressure normally associated with desired full and final inflation of the principal tubular member 14 can be employed. Where such higher pressure fluid sources are employed, it is typically advantageous to include a positive means for preventing over-inflation/pressurization of the principal tubular member 14 thereby forestalling structural damage to the support surface 16 and the outer skin 12. Fluid under pressure can be provided in any suitable or conventional manner such as by an air compressor (not shown) or compressed gas cylinder (not shown) aboard an aircraft. Alternately, air at low pressure suitable for inflating the principal tubular member 14 of the instant invention at 0.5-5 second rates can be obtained employing a bypass bleed from one or more compressor stages associated with a turbine engine aboard an aircraft.

In the embodiment of FIG. 1 it may desirable to provide a conduit 31 by which interstitial pressure within the cavity 28 can be bled. Such a bleed provision assists in assuring against a build up of pressure between the outer skin 12 and the support surface 16 that might otherwise interfere with desirably full inflation of the principal tubular member 14. It may be desirable to join the conduit 31 to a source of vacuum whereby the interstitial space can be maintained under vacuum.

Figure 2:
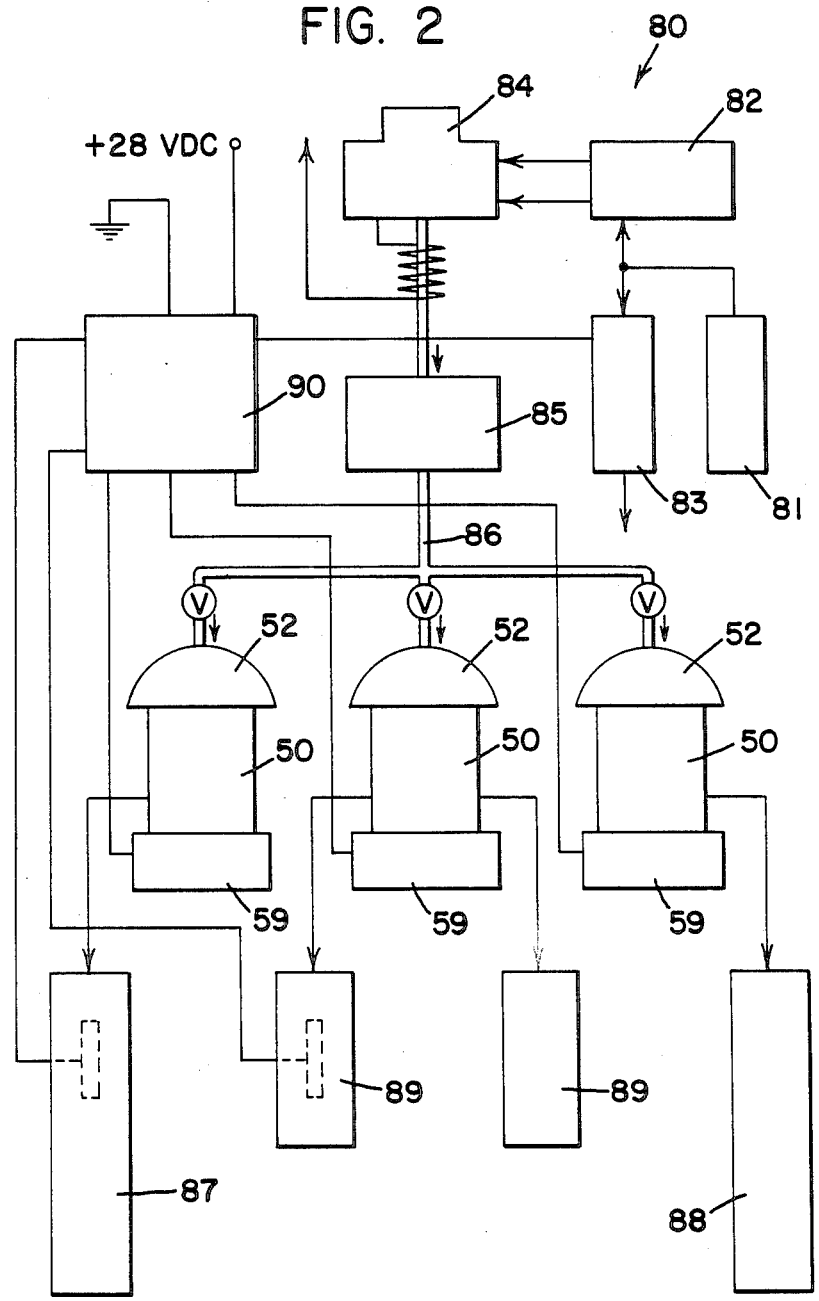
FIG. 2 is a control schematic for controlling activation of de-icers in de-icing a surface in accordance with the instant invention.

In the event it is desired that the tubular inflation chamber 14 be inflated quite rapidly, that is in less than about a second and preferably less than about 0.10 seconds, rapid inflation can be accomplished employing a source of high pressure air and a control schematic as shown in FIG. 3. Referring to the drawings, FIG. 2 depicts a schematic for a system 80 in accordance with the invention for de-icing wings and horizontal stabilizers of an aircraft. The system 80 includes a source 81 of low pressure air such as a compressor or a bleed from a jet engine turbine stage. The source 81 is joined to regulators 82, 83 for assuring a constant supply pressure of the low pressure air source. The regulator 83 is configured to supply low pressure air to an ejector; the regulator 82 is configured to supply an intensifier 84. A suitable intensifier is disclosed in U.S. application Ser. No. 06/822,972 now U.S. Pat. No. 4,706,911 issued, Nov. 17, 1987.

High pressure air in the main accumulator 85 is available through suitable conduits 86 to accumulators 50 associated with pilot valves 52. The high pressure air from the accumulator 50 is then made available to individual wing and stabilizer de-icers 87, 88, 89 having principal inflatable members 14 such as are depicted in FIG. 1.

A control device 90 functions to control the activation of the solenoids 59 associated with the pilot operated valve 52 whereby timed release of high pressure air to the principal inflatable members 14 of the de-icers 87, 88, 89 can be accomplished. Such control can be accomplished in well-known fashion.

It should be understood that the system 80 depicted in FIG. 2 is exemplary only, and that various modifications and alterations may be made thereto in accommodating particular de-icer configurations and the physical valving configurations necessary to supply fluid under pressure thereto. In particular, the low pressure source 81 of air can be replaced by a high pressure source of air such as from a compressor (not shown) or a storage gas bottle (not shown) whereupon the intensifier 84 may become superfluous. Also, the vacuum regulator 83 and the regulator 82 may consist of a single unit supplying low pressure air for vacuum production and for intensification.

Referring to the drawings, FIG. 3 depicts a preferred alternate embodiment of the instant invention wherein the skin portion 12' of the aircraft does not surround the inflation tube 14 in defining the outer skin 12 and wherein the support surface 16, in contrast to FIG. 1, is a continuation of the structure of the skin portion 12'. No intermediate plies 24, 26 are employed in the embodiment depicted in FIG. 5 and the inflation tube 14 is adhered to the support surface 16 in suitable or conventional manner such as by adhesive techniques.

In the embodiment of FIG. 3, the principal inflation tube 14 is subdivided by stitching 21 to form a pair of parallel tubular chambers 18, 18'. The stitching is of a sufficient breadth to define a stitch zone 21' whereby upon inflation of the chambers 18, 18' bending stresses in the skin 12 immediately above the stitch zone 21' engendered by reason of inflation of the chambers 18, 18' does not exceed an endurance limit for the material from which the skin 12 is formed. The stitch zone 21' establishing a spacing between the tubes 18, 18' will of course vary depending in part upon the material forming the skin 12 since various skin materials will have various endurance limits. The stitching 21 equally could be a zone of adhesion or chemical bonding.

By "endurance limit" what is meant is a capability for withstanding at least a million cycles of inflation/deflation of the tubular inflation chambers 18, 18' without significant risk of a brittle or a stress fracture or yielding in the skin 12. The identification of an endurance limit for a particular material and the determination of bending stresses engendered by a particular spacing of the tubular inflation chambers 18, 18' is within the purview of the skill and knowledge of one familiar with the art of strength of materials.

Figure 4:
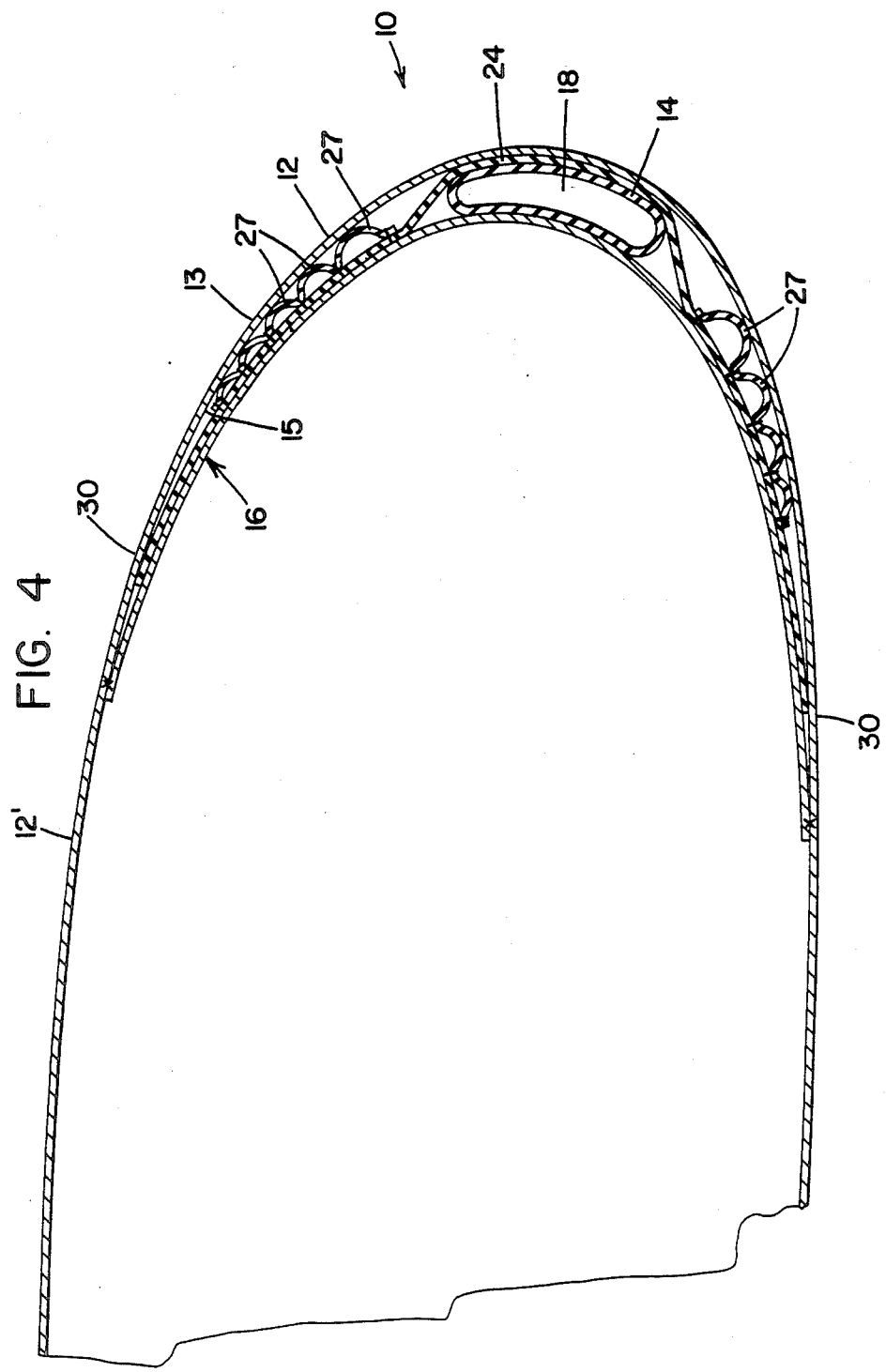
FIG. 4 is a cross-sectional representation of an alternate embodiment of a de-icer in accordance with the invention.

Referring to the drawings, FIG. 4, is a depiction of a further preferred embodiment of the invention wherein an aircraft leading edge is shown in cross-section having a de-icer outer skin 12 having an ice accreting surface 13, an obverse surface 15, and a support surface or layer 20 16 supporting a principal inflation tube 14 having an inflation chamber 18. An intermediate ply 24 lies between the support surface 16 and the obverse surface 15 of the skin 12. No intermediate ply 26 is employed in the embodiment of FIG. 4. The principal inflation tube 14 lies between the intermediate ply 24 and the support surface 16.

In FIG. 4 plurality of additional inflation tubes or tubular members 27 are provided between the intermediate ply 24 and the obverse surface 15. The additional tubular members 27 are configured to, upon inflation, exert de-icing stresses upon the outer skin 12 immediately thereover. The additional tubular members 27 can be of any suitable or conventional nature and typically are formed in a manner similar to the inflation tube 14.

Referring to FIG. 4, it should be apparent that the additional tubular members 27 need not lie between the intermediate ply 24 and the skin 12 obverse surface 15, but rather could lie between the support surface 16 and the intermediate ply 24. It should be apparent that the intermediate ply 24, depending upon desired configuration, may not be necessary, and therefore both the principal tubular member 14 and the additional tubular members 27 can lie or be positioned or affixed upon the support surface 16 for direct contact and interaction with the outer skin 12 obverse surface 15.

Figure 5:
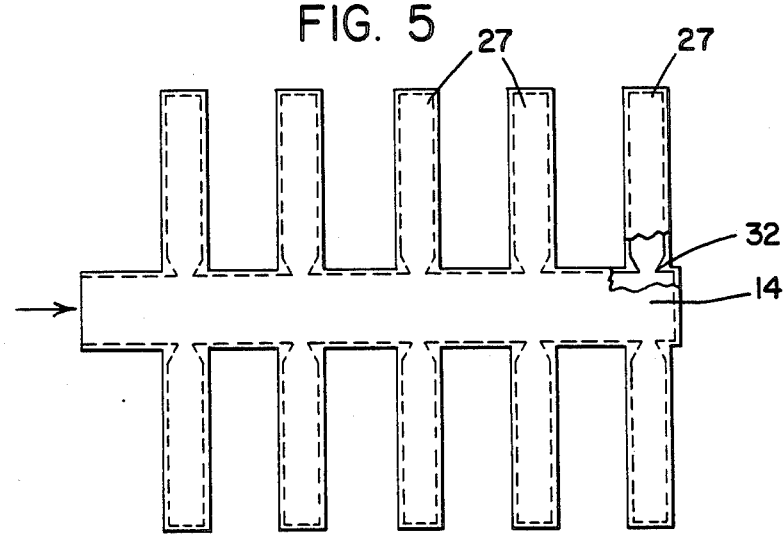
FIG. 5 is a schematic of an inflation tube arrangement.

Referring again to the drawings, FIG. 5 is a representation of a means suitable for inflating the additional tubular members 27. The additional tubular members 27 are configured in fluid communication with the principal inflatable principal tubular member 14 whereby fluid inflating the tubular member 14 can thereafter fill and inflate the additional tubular members 27. Where it is desired that fluid under an elevated pressure be employed to inflate the principal inflatable tubular member 14, it is desirable that the passageway 32 for each additional tubular member 27 be configured to restrict the flow of fluid into the additional inflatable tubular members 27 so that the principal inflation tube 14 can inflate virtually instantaneously with a pressure "snap" prior to significant inflation of the additional tubular members 27. The sizing of a particular restricted passageway 32 is within the purview of one skilled in the art of fluid dynamics.

Figure 6:
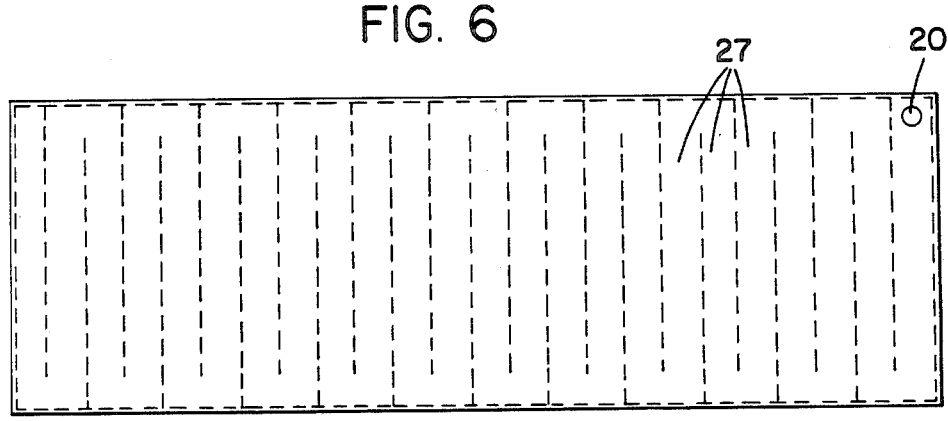
FIG. 6 is an alternate of an inflation tube arrangement.

Referring to FIG. 5, it should be readily apparent that the additional inflatable tubular members 27 need not be inflated employing fluid derived from a filling of the principal inflatable tubular member 14. Referring to FIG. 6 the additional inflatable tubular members 27 can be each inflated employing the source of fluid under pressure through a separate inflation conduit 20 in well-known manner or may be joined to a header (not shown) supplied with fluid under pressure from a source thereof also in well-known manner. The selection of a particular means for inflating the additional tubes 27 is at least in part a function of weight considerations, orientation of the additional tubes 27 with respect to the principal inflation tube 14 (that is whether generally paralleling or lying generally perpendicualr to the principal inflation tube), and the nature and manner in which the principal inflation tube 14 is to be inflated as well as the sequence, if any, in which the principal inflatable tubular member 14 and the additional inflatable tubular members 27 are to be inflated.

In operation, the de-icer of the invention is inflated and deflated in a cyclical manner to remove ice accumulation on the ice accreting surface 13. Where only a single principal inflatable tubular member 14 is employed, the principal inflatable tubular member 14 is alternately inflated and deflated to cause distortion to the outer skin 12 sufficient to remove ice accumulation on the ice accreting surface 13 thereof without exceeding an endurance limitation for the material from which the outer skin is formed. Typically, a time-period often many times longer than the inflation/deflation cycle for the principal inflatable tubular member 14 is provided between discrete inflation periods for the principal inflatable tubular member 14. In other embodiments, it may be desirable alternately to inflate and deflate the principal inflatable tubular member 14 virtually continuously or to inflate the principal inflatable member 14 in small spurts or surges. Generally the longer the time period between inflation cycles for the principal tubular member 14, the greater an ice accumulation thickness developing upon an ice accreting surface 13 and requiring removal. Of course with greater ice accumulation thicknesses generally goes a greater interference with efficient aerofoil performance.

Where additional inflatable tubular members 27 are employed, these additional inflatable tubular members 27 may be inflated concurrently with the principal inflatable tubular member(s) 14, may by the use appropriate restricting passageways 32, be inflated slightly subsequently to inflation of the principal inflatable tubular member(s) 14, or further alternately may be inflated separately from the principal inflatable tubular member 14 optionally on an inflation cycle wholly different from that characterizing the principal inflatable tubular member 14. Typically, where the members 14, 27 are inflated in a coordinated manner, the principal inflatable tubular member 14 is inflated first and then either deflated, or maintained in an inflated or partially inflated state while the additional tubular members 27 are subsequently inflated and then deflated. The particular cycle of inflation/deflation for all the members 14, 27 will to some extent be a function of the nature of the aerofoil or other surface being de-iced and the nature and extent of stress that can be accommodated by a particular material of construction forming the skin 12 and defining the ice accreting surface 13.

Where it is desired that the principal inflatable tubular member 14 be inflated extremely rapidly, that is in less than 0.10 seconds and more preferably in less than 0.50 milliseconds, it may be particularly advantageous to employ the interconnected additional tubes shown in FIG. 5 together with the restricted passageway 32 shown in FIG. 5 to effect inflation of additional tubular members 27. It should be apparent, that in FIG. 5 the principal inflatable tubular member 14 is configured for chordwise orientation of the tubular members 27. By chordwise orientation, what is meant is a manner generally perpendicular to an orientation of the principal inflatable tubular members 14 where the principal inflatable tubular members 14 parallels in spanwise manner the leading edge of an aerodynamic structure such as a wing, strut or an aileron surface.

Referring to the drawings, FIG. 6 shows an alternate pattern for chordwise orientation of additional inflatable tubular members 27 wherein an essentially continuous single tube forms an essentially chordwise pattern. Fluid under pressure for inflating the additional inflatable tubular members 27 is provided through a conduit 20. The tubular member configuration of FIG. 6 can also be used with the additional inflatable tubular members 27 oriented in a generally spanwise manner with respect to a leading edge profile.

Where it is desired that the principal inflatable member 14 be inflated in a rapid series of pulses, the use of a chattering valve can be of value. While chattering in valves is a well-known phenomenon, this phenomenon is typically avoided as undesirable, being carefully designed around a control valve suitable for chattering operation is shown in FIG. 7.

Figure 7:
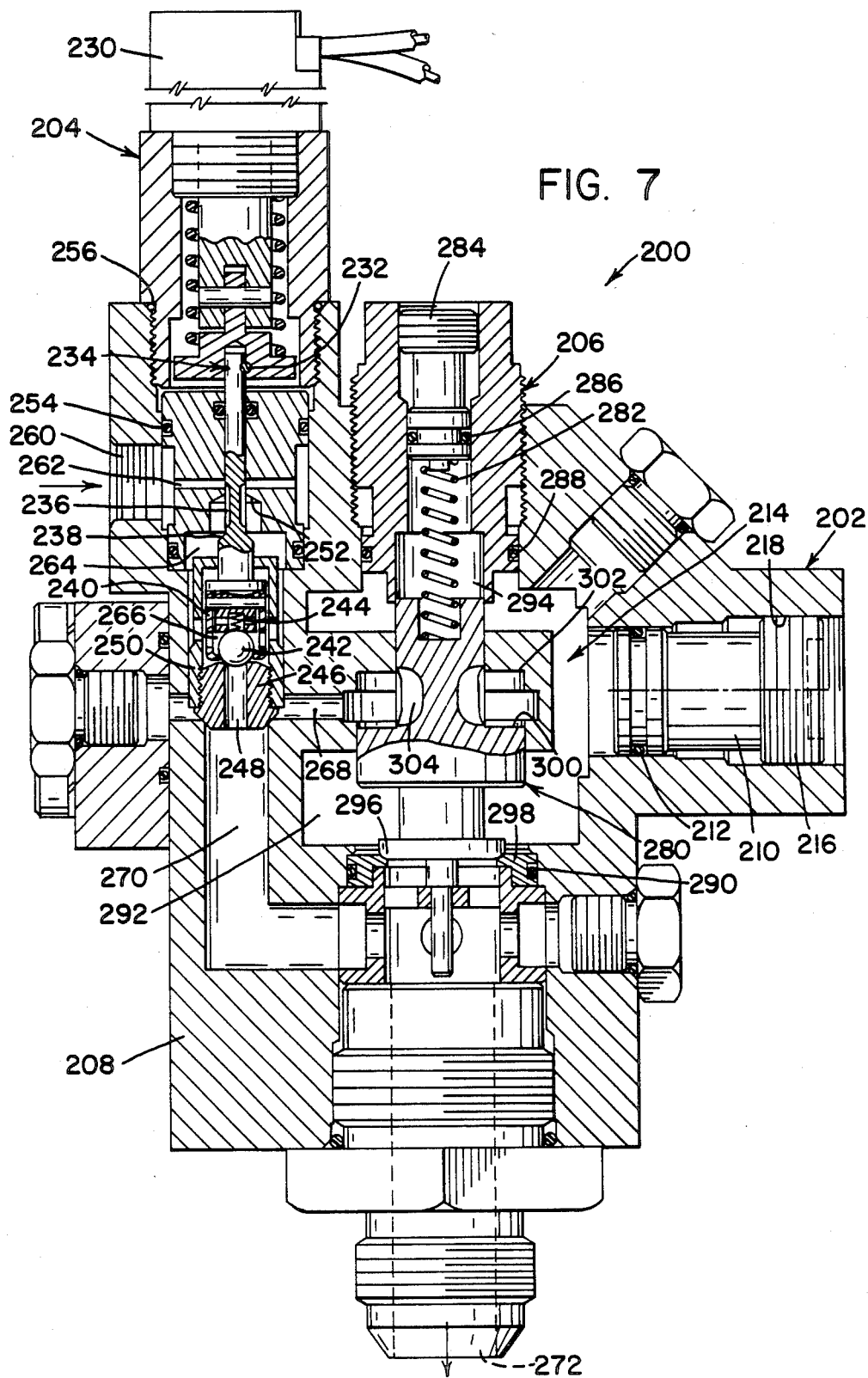
FIG. 7 is a depiction of a valve suitable for use in inflating the principal inflation tube(s).

Referring to FIG. 7 a valve 200 suitable for the practice of the invention is depicted having accumulator 202, solenoid 204, and poppet 206 sections all contained within a housing 208.

The accumulator section 202 includes a plug 210 sealed to the housing 208 employing an "O" ring 212 suitably and retainably received upon the plug 210. The plug 210 and the housing 208 cooperate to define an accumulator chamber 214. The plug 210 includes a threaded portion 216 configured to engage companion threads 218 upon the body 208. The threaded portion functions to retain the plug 210 within the body 208 and can be employed to alter the physical dimension of the the accumulator chamber 214 by making the chamber 214 to be of greater or lesser length.

The solenoid section 204 includes an actuating coil 230 of suitable or conventional nature drivingly coupled employing a roll pin 232 to a pilot pin 234. The pilot pin 234 includes a plurality of flutes 236, a shoulder portion 238, a cage portion 240 attached thereto, a ball 242 and a biasing spring 244 both contained within the cage. A primary seal 246 having an orifice 248 therethrough is contained within a primary seal collar 250 and is configured for motion therewith.

The shoulder portion 238 is configured to engage in a sealing manner against a correspondingly configured seat 252 to prevent a flow of fluid along the pilot pin 234 while the shoulder 238 engages the seat 252 as the actuator 230 lifts the pilot pin 234. "O" rings 254, 256 function to seal the solenoid section 204 against undesired fluid leakage therefrom.

An inlet 260 is provided by which a fluid such as air or other compressible gas is introduced into the valve 200. Gaseous fluid so introduced flows into a chamber 262 and can flow along the flutes 236 of the pilot pin 234 to pressurize a chamber 264. A clearance of at least 0.5 to 1.0 thousandth is provided between the primary seal collar 250 and the valve body 208 whereby the fluid under pressure may pass into and pressurize chambers 266, 268. The primary seal 246 functions therefor together with the biased ball 242 to separate the pressurized fluid from a chamber 270. This chamber 270 is operably connected with an outlet 272 by which fluid under pressure may be passed from the valve 200 to the de-icer of the invention.

The poppet section 206 includes a shuttle 280 biased employing a spring 282. A threaded retainer 284 functions to retain the spring 282 within the poppet section 206. An "O" ring 286 functions to assure against the leakage of fluid under pressure from within the poppet section 206 past the retainer 284. In like manner, "O" rings 288, 290 function to forestall a leakage of fluid under pressure from within the poppet section 206 past the body 208.

A clearance exists of at least about 0.5 thousandths of an inch to about 1.0 thousandths of an inch between the shuttle 280 and the body 208 of the valve 200 whereby fluid under pressure in the chamber 268 may pass to pressurize a pair of chambers 292, 294 as well as the accumulator chamber 214. A lip portion 296 of the shuttle 280 seats upon a poppet seat 298 to forestall the flow of fluid under pressure from the chamber 292 into the outlet 272.

The shuttle 280 includes a shoulder 300 configured to be received upon a counterbore 302 formed in the body 208. This counterbore 302-shoulder 300 engagement functions to establish an upward limitation upon movement of the shuttle 280 in compressing the spring 282. A recess 304 is formed into the shuttle 280 configured to form a low resistance pathway to air flow between the chambers 268, 294 while the shuttle shoulder 300 engages the step 302.

In use the valve 200, while at rest is pressurized throughout the chambers 214, 262, 264, 266, 268, 292, 294 by the application of air under pressure to the inlet 260. Typically this pressure is at least about 1000 psi (6894 kPa), more preferably 1500 psi (10340 kPa), and if desired as much as 2000 psi (13788 kPa) or more. Operation of the valve 200 commences with activation of the solenoid 230.

The solenoid 230 lifts the pilot pin 234 seating the shoulder 238 against the seat 252 thereby terminating access of fluid under pressure from the inlet 260 to the chambers 264, 266 and those supplied with inlet fluid under pressure therethrough. Movement of the pilot pin 234 lifts the ball 242 from the orifice 248 thereby draining fluid pressure in the chambers 264, 266. The fluid pressure in the chamber 268 thereby becomes much greater than the remaining fluid pressure in the chambers 264, 266 and causes thereby the primary seal 246 to lift discharging thereby the fluid under pressure in the chamber 268 to the outlet 272 via the chamber 270.

Reduced fluid pressure in the chamber 268 and the recess 304 caused thereby leaves the fluid pressure in the chamber 292 much more elevated than the fluid pressure in the chamber 268, and this pressure differential, acting upon the shuttle causes the lip 296 to lift from the poppet seat 298 and thereby discharges pressurized fluid from the chamber 292 and thereby the accumulator chamber 214 and the chamber 294 to the outlet 272. However, shuttle 280 movement to engage the shoulder 300 on the step 302 during this discharge of pressurized fluid traps a small amount of fluid under pressure between the shoulder 300 and the step 302 and compresses this trapped fluid. The pressure of this trapped fluid cooperates with the pressure of fluid remaining in the chamber 294 to and the spring 282 to press the shuttle 234 back into a position whereby the lip 296 again engages the seat 298 to forestall further bleed down of pressurized fluid from the chambers 292, 214, and 294.

The pressure present in the chamber 268 again causes a lifting of the primary seal 246 to again bleed pressurized fluid from the chamber 268, and the process of lifting the shuttle is thereby begun again. This cycling continues until the pressurized fluid contained in the accumulator chamber 214 is substantially depleted, whereupon the solenoid 230 is deactivated and a fluid pathway for the replenishment of pressurized fluid in the chambers 262, 264, 266, 268, 292, 294, and 214 is again established.

It should be apparent that the rate of fluid discharge from the chamber 268 may be controlled to a considerably extent by the sizing of the orifice 248, as residual pressure in the chamber 264 materially assists in reseating the primary seal 246 to forestall movement of fluid under pressure from the chamber 268 through the chamber 270 to the outlet 272.

The valve 200 therefor functions to provide a series of pulses of fluid under pressure to the outlet 272. Where the outlet is connected to a de-icer made in accordance with the invention, these pulses function to produce near instantaneous inflation waves within the de-icer tube producing thereby a series of near instantaneous distortions to the ice accreting surface overlying the de-icer tube.

Employing the de-icer of the instant invention, deleterious deterioration and damage of more traditional inflatable pneumatic de-icers positioned typically external upon an outer surface of the skin of an aircraft or other object to be de-iced is avoided where such deterioration or damage is engendered by reason of ultra violet radiation, damage by object strike or rain or sand erosion. The de-icer of the instant invention lies sheltered beneath an outer skin having a substantially elevated modulus and upon which ice accretes and from which accreted ice is dislodged by inflation/deflation cycles of the inflation tubes.

While a preferred embodiment of the invention has been shown and described in detail it should be apparent that various modifications may be made thereto without departing from the scope of claims that follow.

What is claimed is:

1. A valve comprising: accumulator, solenoid, and poppet section;

the accumulator section including an adjustable volume accumulation chamber operably connected to an outlet and an inlet for a fluid under pressure;

the solenoid section including a fluted pilot pin operably connected to a solenoid and further including a caged ball and spring, the ball and spring being configured to forestall movement of the fluid under pressure to the outlet with the solenoid in a particular position and the flutes being configured to provide a passage for fluid under pressure from the inlet to the caged ball and spring while the solenoid is in the particular position, the solenoid section further including a primary seal operably connected to a chamber associated with the poppet section, the chamber being connected in pressurized fluid communication via the flutes whereby fluid under pressure may traverse from the inlet to the chamber, and the chamber being further operably connected whereby fluid under pressure in the chamber acts upon the primary seal and passes thereby to the outlet; and the poppet section including a shuttle configured for movement from a shut-off position whereby movement of fluid under pressure from the accumulator chamber to the outlet is substantially precluded to a release position whereby movement of fluid under pressure from the accumulator chamber is enabled, the shuttle being configured to, while in the release position, entrap a quantity of fluid under pressure in the chamber thereby substantially precluding movement of the entrapped quantity to the outlet and whereby the entrapped quantity assists in returning the shuttle to the shut-off position, the shuttle functioning thereby to oscillate rapidly between the release and shut-off positions producing thereby a chattering discharge of fluid under pressure from the accumulator chamber.

2. The valve of claim 1, the fluid under pressure being a gas.

* * * * *

UNITED STATES PATENT AND TRADEMARK OFFICE
CERTIFICATE OF CORRECTION

PATENT NO. : 4,747,575
DATED      : May 31, 1988
INVENTOR(S) : James C. Putt and Kevin L. Leffel It is certified that error appears in the above-identified patent and that said Letters Patent are hereby corrected as shown below:

Cover Page, (75) Inventors: "Lefeel" should be --Leffel--

Column 3, Line 68    delete "are joined to the", insert --to the desired extent--

Column 4, Line 31    after "The" and before "sufficient" add --inflatable tubular structure is pressurized to a--

Column 5, Line 40    after "most" and before "modulus" add --preferred embodiments it is believed that this--

Column 8, Line 42    delete "be", add --by--.

Signed and Sealed this

Twenty-ninth Day of November, 1988

Attest:

DONALD J. QUIGG

Attesting Officer

Commissioner of Patents and Trademarks